United States Patent [19]

Taylor, Jr.

[11] 4,153,899

[45] May 8, 1979

[54] MTI RADAR SYSTEM AND METHOD

[75] Inventor: John W. Taylor, Jr., Baltimore, Md.

[73] Assignee: Westinghouse Electric Corp., Pittsburgh, Pa.

[21] Appl. No.: 665,643

[22] Filed: Mar. 10, 1976

[51] Int. Cl.² .............................................. G01S 9/42
[52] U.S. Cl. ............................ 343/7.7; 343/17.1 PF
[58] Field of Search ......................... 343/7.7, 17.1 PF

[56] References Cited

U.S. PATENT DOCUMENTS

| | | | |
|---|---|---|---|
| 3,417,396 | 12/1968 | Stifter et al. | 343/7.7 |
| 3,560,972 | 2/1971 | Taylor | 343/7.7 |
| 3,566,402 | 2/1971 | Taylor | 343/7.7 |
| 3,775,768 | 11/1973 | Lisle et al. | 343/7.7 |
| 3,787,851 | 1/1974 | Hughes | 343/7.7 |
| 3,902,174 | 8/1975 | Siegel | 343/7.7 |
| 4,117,538 | 9/1978 | Shrader et al. | 343/7.7 X |

*Primary Examiner*—T. H. Tubbesing
*Attorney, Agent, or Firm*—H. W. Patterson

[57] ABSTRACT

An MTI radar system having a four pulse canceller where the interpulse periods vary preferably according to a double or triple sawtooth pattern is disclosed. The four pulse canceller is comprised of a two pulse canceller cascaded with a three pulse canceller. The three pulse canceller is arranged to accomplish summations of three weighted pulses in two operations, one involving fixed binomial weights (1, -2, 1) and the other variable components (a', b', c'). The interpulse period choices and sequence of use permit the variable weights to be defined by polarity and binary fractions implemented by the use of controllable scalers and polarity reversers.

11 Claims, 5 Drawing Figures

DOUBLE SAWTOOTH

TRIPLE SAWTOOTH

MTI RADAR SYSTEM AND METHOD

BACKGROUND OF THE INVENTION

1. Field of the Invention

The present invention relates generally to moving target indicator (MTI) radars; and more particularly relates to an improved system and method for cancelling echoes from stationary and slowly moving objects.

2. Description of the Prior Art

Moving target indication (MTI) radar is provided to reject signals or echoes from stationary and slowly moving objects, such as terrain, foliage, or surface vehicles; and to pass echoes from moving objects such as aircraft. The radar receivers may utilize digital filters to suppress such echoes; and these filters are generally described as moving target indicators.

Typically, the undesired echoes possess a velocity spectrum, created by the scanning of the radar antenna. To achieve clutter cancellation with typical radar parameters the modulation created by scanning renders it necessary for the MTI to process the last four echoes from each point in range. The processing of these last four echoes is known as four pulse cancellation.

The MTI is blind to aircraft whose radial velocity is such that the aircraft moves an integer number of half-wavelengths between pulses. To eliminate this deficiency, the interpulse period is usually varied in a defined pattern while the antenna beam is scanning past the aircraft. In order to avoid a serious degradation of clutter attenuation utilizing the variable interpulse period (VIP), the weight or multiplying factor for each of the four pulses should be varied as a function of the three interpulse periods between the four pulses. Such weighting is to compensate for the variations in interpulse periods so that the attenuation of low velocity echoes is not degraded. Such a variation of the interpulse period, together with the weighting of the pulses is described in U.S. Pat. No. 3,560,972, together with the manner in which appropriate weights should be selected.

U.S. Pat. No. 3,566,402 describes the advantages of selecting interpulse periods in an exponential sequence to minimize the number of weighting parameters. Sequences of such interpulse period choices as disclosed in said U.S. patent are described as "exponential sawtooth" and "exponential tent" patterns. The exponential single sawtooth pattern utilizes interpulse periods that increase from the smallest to largest period in sequence or which decrease from largest to smallest. The exponential tent pattern utilizes alternate interpulse period choices from the smallest to largest; and then utilizes the interleaved remaining choices from the largest to the smallest. These types of interpulse period sequences improved the width of the clutter notch.

Although, both the systems disclosed in the U.S. Pat. No. 3,566,402 and U.S. Pat. No. 3,560,972 employ apparatus for improving the clutter notch by applying binary weighted factors to a sequence of received echo pulses from a target; and also utilize unique patterns of interpulse period choices which minimize the number of weights which must be employed, it is desirable to provide an interpulse sequence that provides still less dip insensitivity at the first blind speed, and which is more easily filtered in the high voltage power supply of the transmitter.

It is also desirable to provide an MTI radar that provides all of the advantages of a variable interpulse period and weighting as described in the aforementioned patents without the necessity of utilizing multipliers; also it is advantageous to reduce the number of bits used, which saves in storage and arithmetic hardware. Also, it is desirable to utilize only three variable weights as a function of the interpulse periods rather than four, which further saves in hardware costs.

Further, it is desirable that the variable components can be limited to one-bit binary fractions which not only further saves directly in the hardware of the system, but increases the speed of the arithmetic operation, which often results in substantial indirect savings. Finally, it is desirable that such a system utilize a single hardware design that is compatible with a number of different interpulse period sequences.

SUMMARY OF THE INVENTION

A digital MTI radar system where radar transmission pulses are generated at a time interval which has a variable interpulse period; and weighting coefficients are applied to the sequence of pulses. The number of weighting coefficients applied correspond to the number of interpulse periods. The sequence of variable interpulse periods is selected in accordance with a multiple sawtooth pattern.

In one aspect, the system includes a two pulse canceller cascaded with a three pulse canceller. The three pulse canceller is arranged to accomplish summation of the three weighted pulses in two operations: one involving fixed binomial weights, and the other involving variable components. The variable weights are defined by polarity and binary fractions ($\frac{1}{2}$, $\frac{1}{4}$, $\frac{1}{8}$, etc.). The interpulse period choices are exponentially related; and if arranged in ascending order, the ratio of the nth interpulse period to the minimum is defined by the equation $(1.19)^{(n-1)/m}$ where m is 2, 3 or any higher integer value.

The MTI radar preferably includes a bipolar limiter between the two pulse canceller and the three pulse canceller to reduce the number of bits processed.

DESCRIPTION OF THE PREFERRED EMBODIMENT

Figure 1:
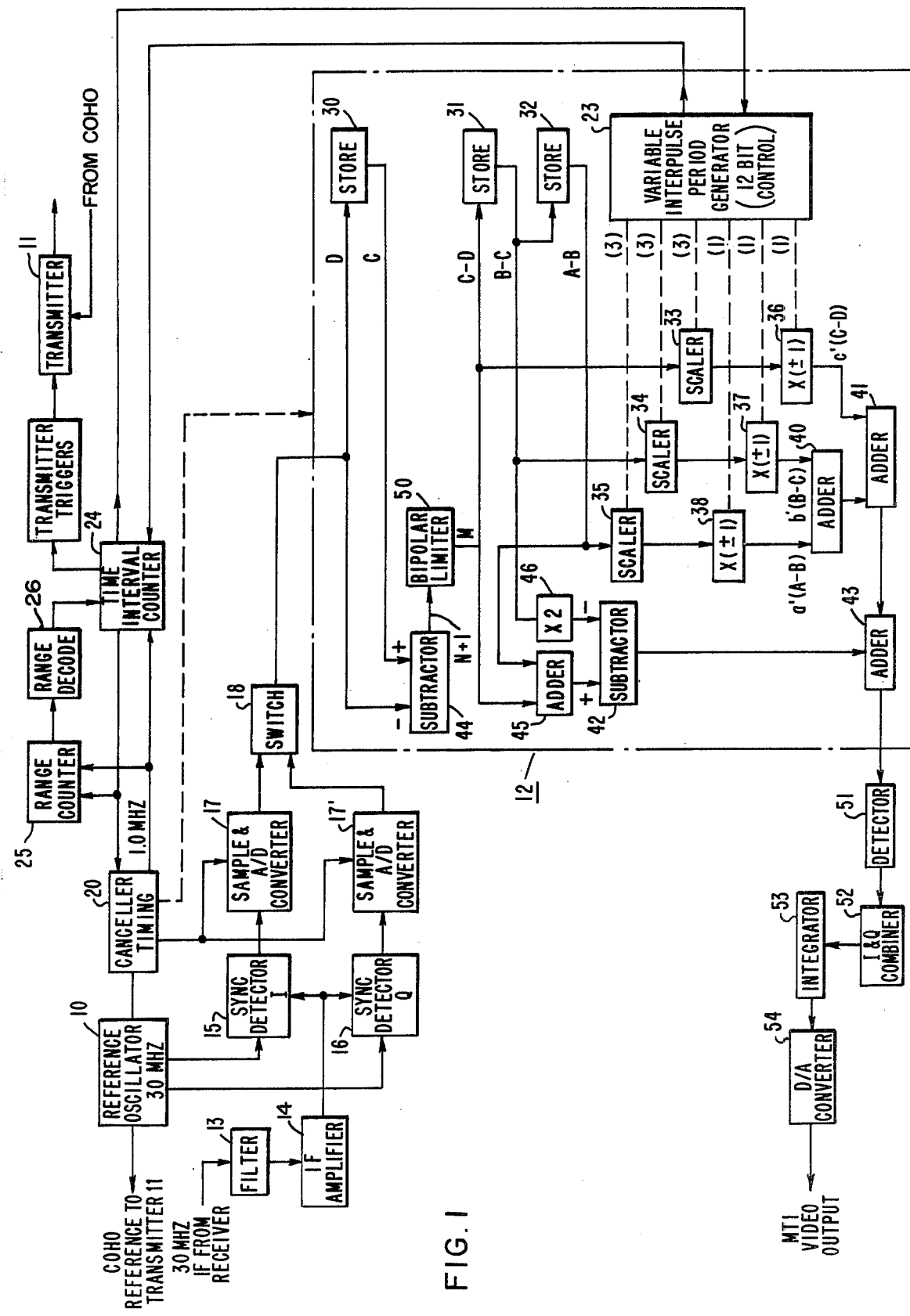
FIG. 1 is a schematic block diagram of an illustrative embodiment of the present invention.

Referring to FIG. 1, a stable oscillator 10 provides a coherent reference frequency for a transmitter 11 as well as the clock frequency for a digital canceller within the dashed lines referred to at 12. An incoming IF signal, after suitable filtering and amplification at 13 and 14 respectively, is directly converted to bipolar video by synchronous detectors. Both I and Q synchronous channels (15 and 16) where I = A cos $\phi$; Q = A sin $\phi$, and in which A = amplitude of the echo; $\phi$ = phase of the echo relative to the local oscillator, are provided to improve detectability and to allow phase information to be extracted after cancellation, if desired. The analog information at the output of the synchronous detectors 15 and 16 is fed to sample and A-D converters 17 and 17' respectively. A switching gate 18 alternately connects the sampled digital words to the canceller 12. The analog information containing one component of the vector is sampled at one microsecond intervals, for example, and converted into an 11-bit digital word. A synchronizer 20 provides the necessary timing for the radar transmitter 11 as well as providing all internal timing for the canceller 12. All timing is derived from the 30 megahertz reference oscillator 10. A variable interpulse period generator 23 is a conventional read-only memory which stores each of the N interpulse periods as digital numbers together with the associated weight for each interpulse period. A time interval counter 24 which is initiated by range decode 26 clocks the desired variable interpulse period. The combined counting by a range counter 25 which defines each discrete range, and by the circuit 24 generates the basic interpulse.

The pulse echo received from a target is amplified by the IF amplifier 14, which could have 20 megahertz bandwidth and provide well over 40 dB gain, for example. The amplifier 14 is preceded by a 200 KHz bandwidth crystal filter 13. The maximum level required by the synchronous detectors 15 and 16 is +5 dbm corresponding to a level, for the least significant bit, of −43 dbm. Since the noise input to the amplifier 14 is −80 dbm, the gain of the amplifier will be adequate.

The synchronous detector is divided into two balanced sections 15 and 16 using Schottky barrier diodes as detectors, for example. An input level is injected into each detector from the coho oscillator 10. This is mixed with the amplified received signals. The output from each is then filtered and sent to the respective A-D converter and sample and hold circuits 17 and 17'. A 90° phase shifter is inserted in the out-of-phase or Q detector 16 line to provide the desired quadrature phase relationship.

The bipolar video signals from the synchronous detectors 15 and 16 are sampled by the sample and hold portions of the circuits 17 and 17' and are converted into digital words. An in-phase (I) signal sample and a quadrature (Q) signal sample are alternately taken through the switching gate 18 and processed by the four pulse canceller at half microsecond intervals. The outputs of the analog to digital converter portions of 17 and 17' are selected to be 10 bits of amplitude plus a sign bit. (The linear dynamic range of the signal chain from the IF input to the A-D converter is 50 dB minimum.)

The A-D converter portions of 17 and 17' may be sequential converters using a voltage summing pattern network with the sample and hold circuit being of similar construction; or, such converter portions of 17 and 17' may be combined with store 30 and subtractor 44 in a hybrid analog-digital configuration of the type described in U.S. Pat. No. 3,894,219, issued to Wayne Weigle. The complete timing and control logic for the A-D converters and sample and hold circuits are self-contained and only two inputs are required to each of the converters 17 and 17': namely the analog video and the sampling clock.

The digital canceller 12 is a four pulse digital canceller which implements the following equation:

$$A - 3B + 3C - D + a'(A-B) + b'(B-C) + c'(C-D) = (1+a')(A-B) - (2-b')(B-C) + (1+c')(C-D)$$

where the capital letters represent successive echo components in a range bin. The digital input signal (D) occurs at intervals not greater than the range resolution of the radar, created by synchronously detecting the received echoes. Data received from the corresponding range from prior transmissions are designated (C), (B), and (A), where the latter (A) is the oldest. Storage devices 30, 31, and 32 retain the data for precisely one interpulse period. These devices 30, 31, and 32 are conventional cores or shift registers, and may be conventional read, write memory devices. A scaler 33 shifts a data word (C−D) to the right a number of spaces designated by the command from variable interpulse period generator 23. The scaler 34 shifts the data word (B−C); and scaler 35 shifts the data word (A−B) in the same manner as the scaler 33. The shifting to right of the data word as designated by the VIP generator 23 is equivalent to multiplying such data word by $\frac{1}{2}$, $\frac{1}{4}$, $\frac{1}{8}$, or 1/16. The scalers 33, 34, and 35 are also capable of inhibiting its output entirely; that is, multiplying by zero. The scalers 33, 34, and 35 may be conventional devices that shift the word to eliminate the most significant bit. A well-known scaler of the type manufactured and sold by Signetics under Model No. 8243 may be used.

At this point in the description, it is apparent that the complete elimination of multipliers has been effected. The utilization of the scalers is made possible by the appropriate selection of the interpulse period sequences as described hereinafter.

The outputs of the scalers 33, 34, and 35 are connected to well-known conventional polarity reversers 36, 37 and 38, respectively, which function to reverse the polarity or sign of the scaled word as required. A summing device 40 sums the output a' (A−B) from the device 38 with the output b' (B−C) from the device 37, which result in turn is summed in a device 41 with the output c' (C−D) from the device 36. The output of the adder 41 and output A−3B+3C−D from a subtractor 42 is summed by an adder 43.

The storage device 30 permits the next to the most recent pulse C to be subtracted from the most recent pulse D, which result is input to the storage device 31 from a subtracter 44. The storage device 30 and the subtracter 44 constitute a two pulse canceller which is cascaded with a three pulse canceller that is made up of the storage devices 31 and 32 together with an adder 45, a doubling device 46 and the subtracter 42. Thus, with this arrangement, time-varying weighting coefficients are applied to only three signals; that is, the subtracted output into the storage device 31, the subtracted input to the storage device 32, and the subtracted output from the storage device 32.

A conventional bipolar limiter 50 which in one embodiment of the invention eliminates two of the most significant bits is preferably utilized between the subtractor 44 and the input to the storage device 31 and the adder 45 to reduce the number of bits processed. The reduction in the number of bits processed by the use of the bipolar limiter is accomplished in a well-known manner by a conventional apparatus. The two pulse canceller reduces the amplitude of the stationary clutter echoes so that the most significant bits are rarely exercised by clutter interference.

The storage device portions 30, 31, and 32 may be of the random access or shift register type as previously mentioned. Random access memory types are addressed by the range counter 25 such that each respective location 30, 31, and 32 contains the appropriate pulse history of a corresponding range cell. Shift register memories are clocked by the time interval counter 24 to provide the same effective outputs. For each pulse transmission, the oldest data in each range cell is shifted out of memory and the newest shifted in. For example, the most recent pulse D is shifted into the portion of the storage device 30 at the same time that the next most recent pulse C is shifted out of the storage device 30. The data representing the difference between the most recent and the second most recent pulse from the subtractor 44 and the limiter 50 is shifted into the portion 31 of the storage device at the same time that the data representing the difference between the third most recent pulse and the second most recent pulse B−C is shifted out of the storage device. Similarly, the data B−C is shifted into the portion 32 of the storage device at the same time as the difference between the fourth most recent pulse and the third most recent pulse A−B is shifted out of the portion 32.

As previously described, the data corresponding A−3B+3C−D from the subtracting device 42 is added by the device 43 to the data value representing a′ (A−B) + b′ (B−C) + c′ (C−D) obtained from the summing device 41.

A detector 51 is a conventional device that functions to remove the polarity indication from the summing device 43 and convert all the digital numbers to a positive sign. An I and Q combiner 52 functions to convert consecutive I and Q data from the detector 51 to a single output which approximates $K \sqrt{I^2 + Q^2}$; one acceptable approximation is 2 (larger) + I + Q. An integrator 53 integrates the pulses from the I and Q combiner 52, which in effect integrates upwardly successive echoes that are received as the antenna beam scans across the target. The device 53 may be of the type described in U.S. Pat. No. 3,906,498, issued to J. W. Taylor, Jr. The output of the integrator 53 is then converted by a digital to analog converter 54, and output to the MTI video output (not shown).

Many radars employ CFAR devices to control the false alarm rate in the presence of rain or man-made interference. In radars which transmit an uncoded pulse, the CFAR device generally follows the I and Q combiner. In radars which transmit a phase-coded pulse, the CFAR device precedes the detector. Since these functions do not relate to the primary task, the discrimination between desired and undesired echoes based on their doppler frequencies, are not shown on the block diagram.

Figure 2:
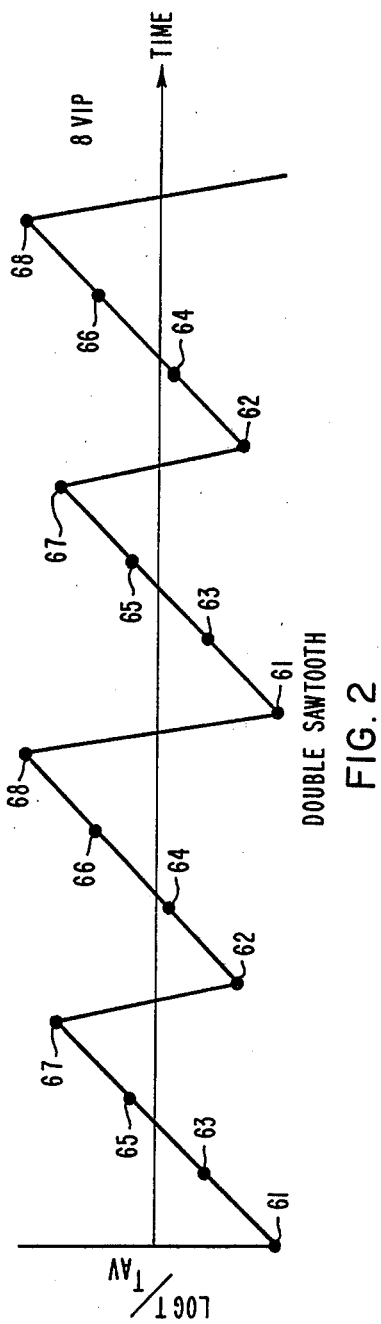
FIGS. 2 and 3 are graphical representations of double and triple sawtooth pattern sequences for the interpulse periods according to the present invention.
Figure 3:
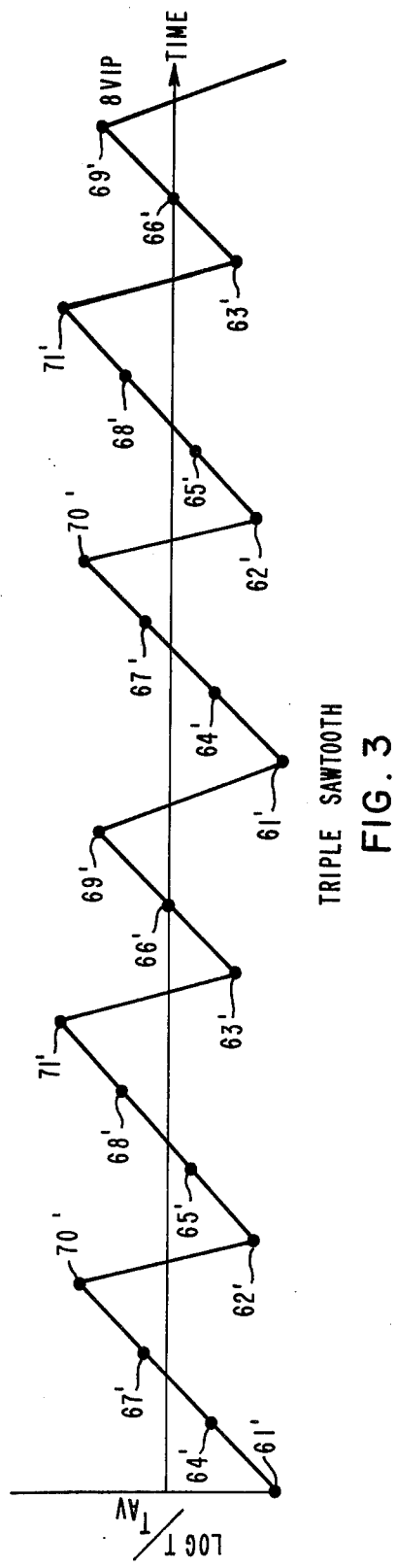

The weighting of the data corresponding to the values (C−D), (B−C), and (A−B) may be performed, in contrast to the prior art, without the use of multipliers; and with the use of inexpensive scalers 33, 34, and 35, respectively. These scalers, are conventional devices that merely shift the data to provide a weighting factor defined by a one-bit binary fraction. This is permitted because of the particular variation in sequential interpulse periods. In accordance with one aspect of the present invention, by varying the interpulse periods such that each subsequent interpulse period is approximately 19% larger or shorter than the preceding or succeeding interpulse period between the flyback periods, the weighting factors may be merely scaled factors, such as ½, ¼, ⅛, 1/16, or zero of the three data values (C−D), (B−C), and (A−B) shifted from the storage devices 30, 31, and 32. The flyback periods are those interpulse periods from period 67 to 62 and 68 to 61 in FIG. 2 and from 70′ to 62′, 71′ to 63′, and 69′ as shown in FIG. 3 hereafter described. The interpulse periods that are either in the neighborhood of 19% shorter or larger than the preceding or succeeding interpulse periods are those in the group formed by successive interpulse periods 61, 63, 65, and 67, in the group 62, 64, 66, and 68 in FIG. 2; and the group formed by successive interpulse periods 61′, 64′, 67′, and 70′, the group formed by 62′, 65′, 68′, and 71′, and the group formed by 63′, 66′, and 69′ as shown in FIG. 3. In the single sawtooth sequence (not shown) each pulse period group would be the shortest pulse period to the largest in the sequence.

In the embodiment described in connection with FIG. 1, the variable interpulse period generator 23 has a 12-bit control such that three bits are used for each of the scalers 33, 34, and 35; and one bit is used for each of the polarity reversers 36, 37, and 38. The number of data values that must be weighted is reduced from four digital words to three digital words for a four pulse digital canceller because of the cascading of the two pulse and three pulse digital canceller as previously described. The two pulse canceller stage suppresses the strong echoes from stationary clutter, so that the dynamic range of subsequent operations may be reduced. The number of bits that are utilized for each digital word, may be reduced from 11 bits to 8 or 9 bits, for example, by means of the bipolar limiter (or alternatively a modulo N arithmetic operation) 50 by merely eliminating the desired number of most significant bits. The total amount of storage required for an MTI radar varies considerably from one type of radar to another, dictated by the range, sampling rate and number of bits supplied by the A/D converters 17 and 17′. The arithmetic operations of the canceller 12, however, do not vary. If the canceller 12 is packaged separately and is made capable of handling the number of bits and speed of the most demanding application, such a module can be widely employed. For example, in the embodiment utilizing the bipolar limiter, the input from the A/D converters 17, 17′ to the subtracter 44, and from the portion 30 of the storage device to the subtracter 44 may be capable of accepting inputs up to 11 bits; the input to the portions 31 and 32 of the storage devices and the adder 45, doubler 46 and the subtracter 42 may be 9 bits maximum. The data rate would be a minimum of 2.2 input words per microsecond.

A variety of variable interpulse patterns may be utilized in the embodiment described in FIG. 1, but the multiple sawtooth sequences provide less dip insensitivity at the first "blind" speed. These sequences have the added advantage of providing a higher frequency load disturbance at the transmitter power supply, which is easier for the filter to smooth out. Ripple on this power supply voltage must be compensated by electronic regulation of the modulator pulse, and the amount of power dissipated in this device is proportional to the amount of ripple it must accommodate. In accordance with another aspect of the invention, and referring to FIG. 2 a double sawtooth variable interpulse period sequence is graphically illustrated for an embodiment that has 8 variable interpulse periods, for example. In FIG. 2, the points 61 through 68 represent interpulse periods that have 8 different variations. The shortest interpulse period is represented by the point 61 and the longest interpulse period is represented by the point 68, with each point 62 through 67 representing the successively longer interpulse period in ascending order. Thus, as viewed in FIG. 2, a double sawtooth is that sequence of variable interpulse periods where the shortest interpulse period is succeeded by every alternate interpulse period until either the next to the longest variable period 67 or the longest variable period 68 is reached. Thus, if the interpulse period 61 is followed by the periods 63, 65, and 67, the next interpulse period is 62, 64, 66, and 68. This skipping of every other pulse in ascending (or descending) order is what is known as an exponential double sawtooth sequence.

Referring to FIG. 3, which is a graphical illustration of a triple exponential sawtooth, for an embodiment having 11 different variable interpulse periods, the order of pulse periods is represented by the points 61' through 71' with 61' being the shortest pulse period and 71' being the longest. In this sequence, every third pulse in ascending (or descending) order is arranged to occur in sequence.

For a single sawtooth pattern, the sequence of variable pulses is the same as (or the reverse of) the ascending order. For example, the shortest pulse period, such as 61, would be followed by the next longest pulse period 62, and so on, until the longest period 68 is reached, at which time the sequence would start over with the shortest pulse period 61. For an exponential tent pattern, the shortest pulse period, such as 61, is followed by the next shortest pulse period 62 and so on until the longest pulse period 68 is reached, at which time the next longest pulse period 67 is repeated followed by the third longest pulse period 66 and so on in sequence until the variable pulse period 61 is reached. For a more detailed explanation of the exponential tent and single sawtooth pattern, reference is made to the previously mentioned U.S. Pat. No. 3,566,402.

Figure 5:
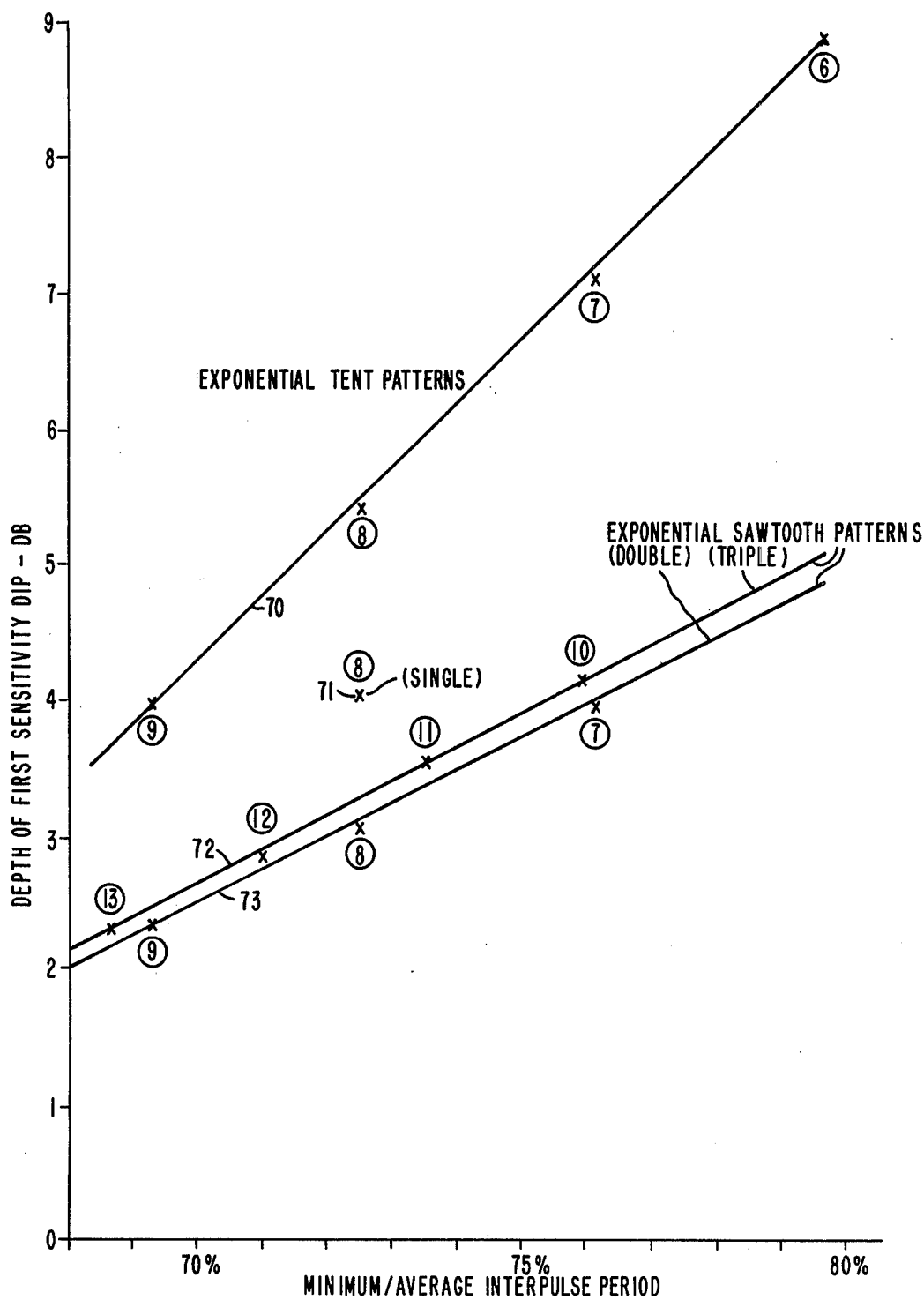
FIG. 5 is a diagram illustrating the results obtained for various sawtooth sequences for various numbers of interpulse periods to show the advantages of the present invention.

Referring to FIG. 5, there is shown a diagram illustrating the depth of the first sensitivity dip as a function of the minimum/average interpulse period for various exponential patterns. The circled digits of FIG. 5 represent the number of interpulse periods in a particular sequence. For example, the circled numeral 8 indicates that there were 8 different variable interpulse periods utilized for a particular embodiment such as the 8 variable interpulse periods described in connection with FIG. 2. The circled numeral 11 indicates that there are 11 different variable interpulse periods in a sequence, as described in FIG. 3 for example. The choice of the minimum to average interpulse period represented typically as from 70% to 80% in FIG. 5, as well as the number of variable interpulse periods in a sequence, may be restricted, to some degree, by constraints imposed on the radar design by other considerations. For example, the number of pulses in the variable interpulse period sequence is generally less than the number of pulses radiated within the antenna beam width. The wider the variable interpulse deviation, the better the sensitivity near the velocity which would be blind at fixed interpulse periods but the lower must be the pulse repetition frequency. In some radars, this velocity is below the band of interest, so less deviation can be utilized to increase the number of hits per beam width (N). If the clutter residue at the MTI output is predominantly caused by scanning modulation, its power is proportional to $N^{-6}$.

A line referred to at 70 in FIG. 5 represents the depth of the first sensitivity dip in decibels as a function of the minimum to average interpulse period for exponential tent sequences that utilize from 6 through 9 different variable interpulse periods. For example, if there are eight different interpulse periods in the sequence, the depth of the first sensitivity dip is approximately 5 decibels for a minimum to average interpulse period of approximately 72%. For the same number of interpulse periods in the sequence, in a single exponential sawtooth pattern referred at 71, the depth of the first sensitivity dip is less than 4 decibels for a 72% minimum to average interpulse period. Line 72 represents a triple sawtooth pattern as described in connection with FIG. 3 while line 73 represents a double sawtooth pattern as described in connection with FIG. 2. For a sequence with 8 different pulse periods, utilizing the double sawtooth pattern and an approximate 72% minimum to average interpulse period the depth of the first sensitivity dip is less than 3 decibels. The triple sawtooth pattern requires a sequence of 12 various interpulse periods with a minimum to average interpulse period of approximately 71% for the depth of the first sensitivity dip to be below 3 decibels. Thus, from the diagram of FIG. 5 it is apparent that the exponential sawtooth patterns are far superior to the exponential tent patterns in that they provide substantially less dip in sensitivity for identical interpulse period choices. Similarly, the multiple sawtooth patterns are significantly better than a single sawtooth. The single sawtooth example shown has 8 different interpulse periods in the sequence. The double sawtooth pattern provides the least sensitivity dip in decibels over any of the exponential patterns described. Although, the ability of the variable interpulse period patterns to eliminate blind speeds of a four pulse canceller has been shown and described in connection with the description of the four pulse canceller comprised of a two pulse canceller cascaded with a three pulse canceller as shown in FIG. 1, it is understood that the same ability is attained utilizing such a variable interpulse sequence in a four pulse canceller of the type described in U.S. Pat. No. 3,560,972 and U.S. Pat. No. 3,566,402, for example.

Tables 1-4 are typical lists of N interpulse period sequences and the variation of the weights with time. The interpulse periods are defined by percentage deviations from the average interpulse period and are employed sequentially in the order listed. The first horizontal line of weights, as shown in Tables 1-4 is applied to echoes separated by the interpulse periods 1, 2, and 3 bearing the heading VIP%; and the second line of weights is applied to echoes separated by the interpulse periods 2, 3, and 4 in the column VIP% etc., with the final horizontal line separated by interpulse periods (N), 1, 2. The weights headed by the column a is applied to the oldest echo in storage (A), the weight $-b$ is applied to the second oldest echo in storage B, the weight c is applied to the third oldest echo in storage C, and the weight $-d$ is applied to the newest echo. The columns headed Variable Component with the subheadings a', b', and c' specifically apply to the two pulse canceller cascaded with the three pulse canceller described in connection with FIG. 1 with the weight a' being applied to the oldest difference (A−B), the weight b' being applied to the next oldest difference (B−C), and the weight c' being applied to the most recent difference (C−D).

Table 1 following shows a typical set of sequences for echo weighting, and the variable components which are provided by the scaling devices 33, 34, 35 (FIG. 1) for a canceller having 8 different pulse periods in the sequence utilized in an exponential tent pattern where the percentage deviation from the average interpulsed period is approximately 27%.

TABLE 1

|     | VIP%   | Weighting of Four Echoes | | | | Variable Component | | |
|-----|--------|--------|--------|--------|--------|------|-------|------|
|     |        | a      | −b     | c      | −d     | a′   | b′    | c′   |
| (1) | −27.46 | 1.0000 | 3.1250 | 3.0000 | 0.8750 | +1/4 | +1/16 | −1/4 |
| (2) | −13.81 | ″      | ″      | ″      | ″      | ″    | ″     | ″    |
| (3) | + 2.39 | 1.2500 | 3.1875 | 2.8125 | 0.8750 | +1/4 | +1/16 | −1/8 |
| (4) | +21.65 | 1.0000 | 2.8750 | 3.0000 | 1.1250 | 0    | +1/8  | +1/8 |
|     | +32.59 | ″      | ″      | ″      | ″      | −1/4 | +1/16 | +1/4 |
|     | +11.60 | ″      | ″      | ″      | ″      | ″    | ″     | ″    |
|     | − 6.03 | ″      | ″      | ″      | ″      | 1/4  | +1/8  | +1/8 |
| (n) | −20.93 | ″      | ″      | ″      | ″      | 0    | −1/8  | −1/8 |

Table 2 is similar to Table 1 except that the sequence is for a single sawtooth pattern.

TABLE 2

|     | VIP%   | Weighting of Four Echoes | | | | Variable Component | | |
|-----|--------|--------|--------|--------|--------|------|-------|------|
|     |        | a      | −b     | c      | −d     | a′   | b′    | c′   |
| (1) | −27.46 | 1.1250 | 3.0625 | 2.8125 | 0.8750 | +1/8 | +1/16 | −1/8 |
| (2) | −20.93 | ″      | ″      | ″      | ″      | ″    | ″     | ″    |
| (3) | −13.81 | ″      | ″      | ″      | ″      | ″    | ″     | ″    |
| (4) | − 6.03 | ″      | ″      | ″      | ″      | ″    | ″     | ″    |
|     | + 2.39 | ″      | ″      | ″      | ″      | ″    | ″     | ″    |
|     | +11.60 | ″      | ″      | ″      | ″      | ″    | ″     | ″    |
|     | +21.65 | 0.7500 | 2.2500 | 3.0000 | 1.5000 | −1/4 | +1/2  | +1/2 |
| (n) | +32.59 | 0.5000 | 2.6250 | 3.2500 | 1.1250 | −1/2 | −1/8  | +1/8 |

Table 3 is similar to the previously listed tables except that it provides for a double sawtooth pattern.

TABLE 3

|     | VIP%   | Weighting of Four Echoes | | | | Variable Component | | |
|-----|--------|--------|--------|--------|--------|------|-------|------|
|     |        | a      | −b     | c      | −d     | a′   | b′    | c′   |
| (1) | −27.46 | 1.2500 | 3.1875 | 2.6875 | 0.7500 | +1/4 | +1/16 | −1/4 |
| (2) | −13.81 | ″      | ″      | ″      | ″      | ″    | ″     | ″    |
| (3) | + 2.39 | 0.8750 | 2.3750 | 2.7500 | 1.2500 | −1/8 | +1/2  | +1/4 |
| (4) | +21.65 | 0.7500 | 3.2500 | 3.6250 | 1.1250 | −1/4 | −1/2  | +1/8 |
|     | −20.93 | 1.2500 | 3.1875 | 2.6875 | 0.7500 | +1/4 | +1/16 | −1/4 |
|     | − 6.03 | ″      | ″      | ″      | ″      | ″    | ″     | ″    |
|     | +11.60 | 0.8750 | 2.3750 | 3.0000 | 1.5000 | −1/8 | +1/2  | +1/2 |
| (n) | +32.59 | 0.5000 | 2.5625 | 3.0625 | 1.0000 | −1/2 | −1/16 | 0    |

Table 4 is similar to the previously listed tables except that it is for a sequence having 13 variable pulse periods with a 31% deviation from the average interpulse period for a triple sawtooth sequence.

TABLE 4

|     | VIP%   | Weighting of Four Echoes | | | | Variable Component | | |
|-----|--------|---------|--------|--------|--------|------|-------|------|
|     |        | a       | −b     | c      | −d     | a′   | b′    | c′   |
| (1) | −22.82 | 1.2500  | 3.1875 | 2.6875 | 0.7500 | +1/4 | +1/16 | −1/4 |
| (2) | − 8.09 | ″       | ″      | ″      | ″      | ″    | ″     | ″    |
| (3) | + 9.46 | 0.8750  | 2.3750 | 3.0000 | 1.5000 | −1/8 | +1/2  | +1/2 |
| (4) | +31.43 | 0.5000  | 2.5625 | 3.0625 | 1.0000 | −1/2 | −1/16 | 0    |
|     | −27.20 | 1.25000 | 3.1875 | 2.6875 | 0.7500 | +1/4 | +1/16 | −1/4 |
|     | −13.29 | ″       | ″      | ″      | ″      | ″    | ″     | ″    |
|     | + 3.27 | 0.8750  | 2.3750 | 3.0000 | 1.5000 | −1/8 | +1/2  | +1/2 |
|     | +23.99 | 0.5000  | 2.5625 | 3.0625 | 1.0000 | −1/2 | −1/16 | 0    |
|     | −31.32 | 1.2500  | 3.1875 | 2.6875 | 0.7500 | +1/4 | +1/16 | −1/4 |
|     | −18.20 | ″       | ″      | ″      | ″      | ″    | ″     | ″    |
|     | +16.03 | 0.8750  | 2.3750 | 3.0000 | 1.5000 | −1/8 | +1/2  | +1/2 |
| (n) | +39.32 | 0.5000  | 2.5625 | 3.0625 | 1.0000 | −1/2 | −1/16 | 0    |

It is understood, that the various weights listed in Tables 1-4 are not the only choices for the respective VIP sequences. Those listed involve weights that provide the deepest clutter notch for a specific number of interpulse periods, if depth of the clutter notch is defined as the maximum response for a velocity less than 0.025. In some applications, the clutter spectrum created by antenna scanning, or low frequency modulations within the radar, may make a wider notch preferable to a deeper one. This can be accomplished by adding 1/16 to all b′ weights where this action does not result in a two-bit number. In yet another sense, the weights listed in Tables 1-4 are typical rather than unique sequences. The VIP sequence may be reversed, either left to right or top to bottom, without affecting velocity response. The sequence of weighting factors is different although the values are the same.

Figure 4:
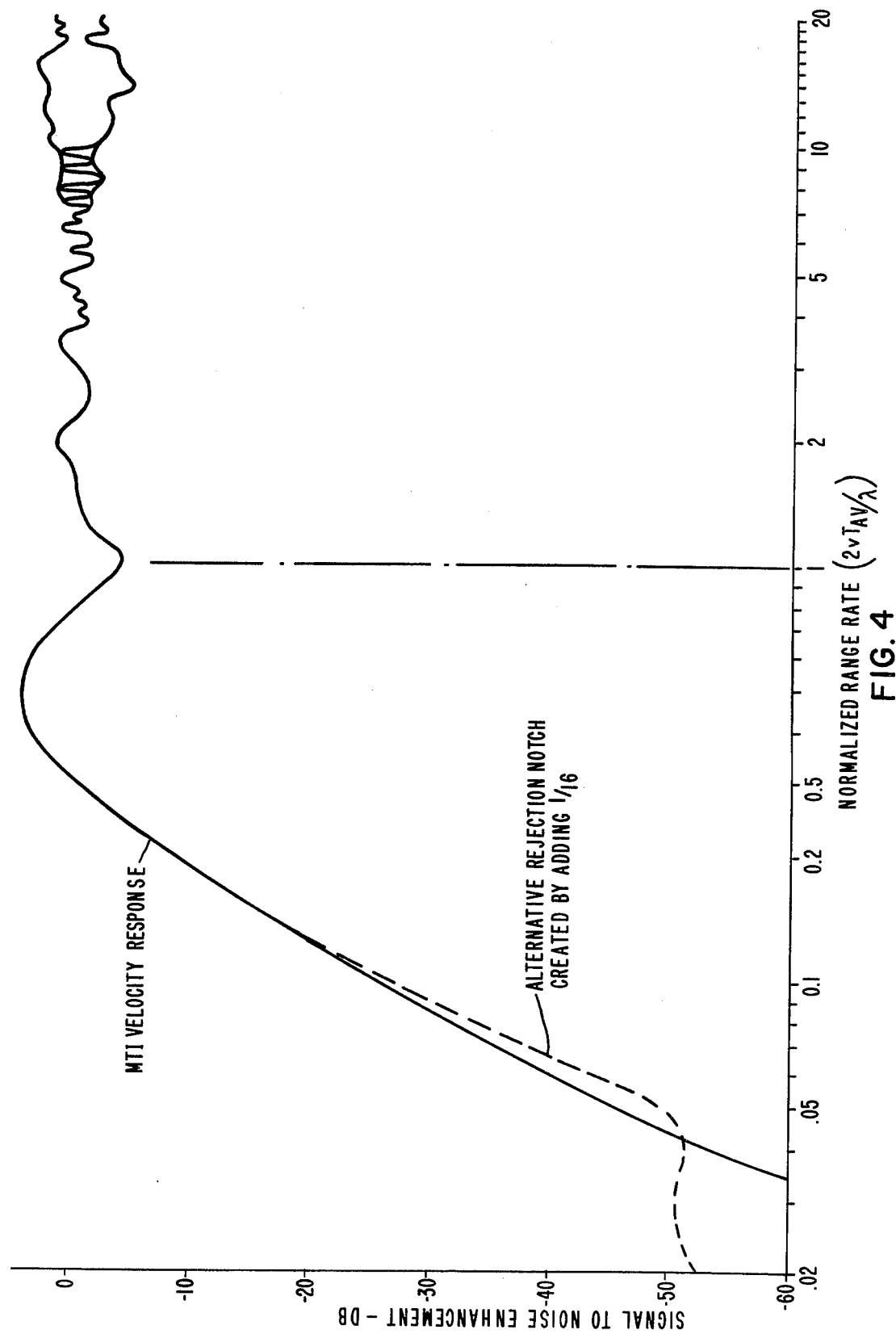
FIG. 4 is a graphical representation of the performance attainable in practicing the present invention.

Although the interpulse periods are tabulated to great precision, this is only for the purpose for computing velocity responses as shown in FIG. 4. A normalized velocity scale is employed in FIG. 5, where unity represents 360° phase change during the average interpulse period, a doppler frequency equal to the pulse repetition frequency, or a velocity of $\lambda/2T_{av}$ (where $\lambda$ is wavelength and $T_{av}$ is the average interpulse period). With a fixed interpulse period, complete blindness occurs at 1, 2, 3, and 4, as shown in FIG. 4. Variable interpulse periods eliminates the blindness, although there is some slight insensitivity near point 1 and a few other points.

If the interpulse periods to be employed in a double sawtooth pattern are arranged in order of length rather than order of use, and the shortest interpulse period is defined as $T_1$, the others are defined by the equation $$T_n = 1.09\, T_{n-1}$$

$$T_{av} = \sum_{1}^{N} T_n / N$$

In other words, each interpulse period is 9% longer than the next shorter. All sequences described in detail utilize this 9% increment, and, as a consequence, produce some insensitivity near $1/.09 = 11$, $2/.09 = 22$, etc. The insensitivity in this region is slightly more than at unity velocity. It is noted, that minor deviation from the designated interpulse periods have little effect on the low velocity response, but can shift the response at high velocity. This fact can be utilized to smooth out the response near 11 and 22 above it the VIP pattern can be repeated several times during the passage of the antenna beam across the target. The same basic pattern is employed each time but the starting points can differ by approximately 1%. Likewise, it should be apparent that interpulse period increments slightly greater or slightly less than 9% will provide comparable results. The double sawtooth sequence of the variable interpulse periods provide the optimum 19% increase in pulse period length between sequential pulses.

The variable weights as shown in the previous tables may be determined in accordance with the following method.

Let $T_1$, $T_2$, and $T_3$ be the interpulse periods between the four pulses, with $T_1$ being the oldest pair.

$$x = \frac{T_2 - T_1}{T_2} \text{ and } y = \frac{T_3 - T_2}{T_2}.$$

Let the weights of the four pulses a, $-b$, c, $-d$, with "a" being the oldest. Earlier calculations have shown that, if subsequent CPACS or LOG CFAR circuitry permits the small variation in noise gain to be ignored:

$$a = 1 + 3y/2 + y^2/2$$

$$d = 1 - 3x/2 + x^2/2$$

$$b + K = 4 - d - m$$

$$c + K = 4 - a - m$$

where K is a small fraction used if it is desired to move a zero to a velocity (on the normalized scale) of $\sqrt{K}/2\pi$. and $$m = 4(x-y) + 3xy - x^2y/2 + xy^2/2 - x^2 - y^2$$

The corresponding fractional weights for the three pulse canceller are a', b', c'.

$$a' = +3y/2 + y^2/2$$

$$c' = -3x/2 + x^2/2$$

$$b' + K = (x-y) + 3xy + \tfrac{1}{2}(x-y)(xy) - a' - c'$$

To select binary approximations for each set of four weights, multiply each by a chosen number which will cause the first and last weights to deviate from unity by nearly binary fractions. These deviations are the fraction weights (a' and c'). The value of b' is chosen, keeping in mind an acceptable range of the parameter K.

In summary, there has been described an improved exponential multiple sawtooth pattern that may be utilized in an MTI radar system having a four pulse canceller, which improves the velocity response of the system. In this connection, if it is desired to have a wider notch in contrast to a deeper one, 1/16 may be added to all b' variable weights, where this addition does not result in a two-bit number. Such effect is illustrated in FIG. 4 by the dotted line portion of the curve. Although, the choice of the 9% exponential increments of interpulse periods as previously described dictates the first and third fractional weights (a' and c'), the middle weights can be selected to fine tune the clutter notch. Also, there has been described an improved MTI radar system having a four pulse canceller that includes a two pulse canceller cascaded with a three pulse canceller with a limiter between the cascaded cancellers to reduce the number of bits processed. The three pulse canceller is arranged to accomplish the summations of the weighted three pulses in two operations, one involving fixed binomial weights (1-2,1) and the other variable components (a', b', c'). The interpulse period choices in sequence of use which permit the variable weights to be defined by polarity and binary fractions; and wherein the variable weights are a function of the length of the three interpulse periods. The choices of the interpulse periods, are exponentially related and provide the best performance as shown in FIG. 5 in a double sawtooth pattern. If arranged in ascending order, as previously mentioned, the ratio of the nth interpulse period to the minimum is defined by the equation $(1.19)^{(n-1)/m}$ where m is 2,3 or any higher integer value. It is understood, that the sequence of interpulse periods in the desired sawtooth pattern may be either in ascending or descending order. Although, the present invention has been described in certain aspects in connection with a four phase canceller, it is understood that if desired a canceller of a greater number of pulses may be utilized in practicing the invention.

While the present invention has been described with a degree of particularity for the purpose of illustration, it is to be understood that all modifications, alterations, or substitutions within the spirit and scope of the present invention are herein meant to be included.

What we claim is:

1. In a digital MTI radar system, the combination comprising:
   means for generating radar transmission pulses with a variable interpulse period following either an increasing or decreasing exponential multiple sawtooth pattern;
   means for receiving pulse echoes;
   means for comparing a sequence of at least four of said pulse echoes; and
   means for variably weighting individual echoes when comparing said sequence to improve the velocity response of the system.

2. The combination of claim 1 wherein the pulse generating means comprises means to generate radar pulses with a variable interpulse period that corresponds to an increasing or decreasing an exponential double sawtooth pattern.

3. The combination of claim 1 wherein each of the variable interpulse periods in successive predetermined variable interpulse period groups is in the neighborhood of 19% different than the preceding and succeeding interpulse period in its respective group; and the means for variably weighting the individual echoes includes a digital scaler to weight each respective echo with a binary fraction.

4. In a digital MTI radar system, the combination comprising:
   means for generating radar transmission pulses with variable interpulse periods;
   means for extracting one or both components of the echo vectors of said radar transmission pulses in phase or in quadrature with a reference signal;
   means for sampling said component at regular intervals in range;
   means for converting said range sample into a digital word;
   means for processing repetitively from the same range at least four of the most recent digital words, said processing means including:
   a two pulse canceller operative to compare the two most recent digital words in the sequence to obtain a first digital word result,
   limiting means to eliminate at least two of the most significant bits of each of the resulting digital words of the two pulse canceller,
   a three pulse canceller portion including means to combine and weight the three most recent digital word results from the limiting means to obtain a digital solution; and
   means for converting said digital solution of inphase and quadrature components into a single output in a form for display or subsequent digital processing.

5. The combination of claim 4 wherein each of the variable interpulse periods in successive predetermined variable interpulse period groups is in the neighborhood of 19% different in length than the preceding and succeeding interpulse period in its respective group, and wherein said combining and weighting means includes a scaler for each of the digital words to weight each respective word with a binary fraction.

6. The combination of claim 4 wherein the radar transmission pulse generating means comprises means to generate radar pulses with a variable interpulse period that corresponds to a multiple sawtooth pattern sequence.

7. In a digital MTI radar system, the combination comprising:
   means for generating radar transmission pulses with variable interpulse periods, each said interpulse periods in successive predetermined groups being in the neighborhood of 19% different in length than the preceding and succeeding interpulse period in its respective group;
   means for extracting one or both components of the echo vectors of said radar transmission pulses in phase or in quadrature with a reference signal;
   means for sampling said component at regular intervals in range;
   means for converting said range sample into a digital word;
   means for processing repetitively from the same range at least four of the most recent digital words, said processing means including:
   a two pulse canceller portion operative to compare the two most recent digital words in the sequence to obtain a first digital word result,
   a three pulse canceller portion including scaling means to weight each of the three most recent digital word results with a binary fraction, the vaue of which is a function of the variable interpulse periods between the transmission pulses, to provide a digital solution; and
   means for converting said digital solution of inphase and quadrature components into a single output in a form for display or subsequent digital processing.

8. The combination of claim 7 wherein the radar transmission pulse generating means comprises means to generate radar pulses with a variable interpulse period that corresponds to a multiple exponential sawtooth pattern.

9. The combination of claim 8 wherein the radar transmission pulse generating means comprises means to generate radar pulses with a variable interpulse period that corresponds to a double exponential sawtooth pattern.

10. The combination of claim 8 further comprising means to eliminate a predetermined number of the most significant bits of the digital word result within the constraints of the dwell time of the antennae.

11. In an MTI radar system, the combination comprising:
   means for generating radar transmissions with a sequence of variable interpulse periods where the nth shortest interpulse period has a length relative to the shortest corresponding to the formula $(1.19)^{(n-1)/m}$ where m is 2, 3 or any higher integer value;
   means for extracting one or both components of the echo vectors of said radar transmissions in phase or in quadrature with a reference signal;
   means for sampling said component at regular intervals in range;
   means for converting said range sample into a digital word;
   means for processing repetitively from the same range at least four of the most recent digital words, said processing means including:
   first means to subtract the second most recent word from the first most recent word,
   limiting means to eliminate a plurality of the most significant bits from the results of the first means, the number of said bits eliminated depending on the rotational speed of a radar antenna,
   said means to add the word from the limiting means for the first and second most recent words with the word from the limiting means for the third and fourth most recent words,
   third means to double the word value of the limiting means for the second and third most recent words,
   fourth means to subtract the results of the second and third means,
   scaling means including polarity reversal means governed by the radar transmission generating means to weight the word value of the limiting means for each of the first and second, second and third, and third and fourth digital word with a binary fraction, said weights being controlled by the length of said interpulse periods, fifth means to add the scaled words from the limiting means for the second and third, and third and fourth most recent digital words, sixth means to add the results of the fifth means with the scaled word from the limiting means for the first and second most recent words, seventh means to add the results of the sixth means to the results of the fourth means; and means including means to convert the digital word from the seventh means to a single value to provide an indication.

* * * * *